Dec. 30, 1941.   A. NOVICK   2,268,080
MEANS FOR MAKING CLASP FASTENERS
Filed July 29, 1938   6 Sheets-Sheet 1

INVENTOR.
Abraham Novick
BY Moses & Nolte
ATTORNEYS

Dec. 30, 1941.   A. NOVICK   2,268,080
MEANS FOR MAKING CLASP FASTENERS
Filed July 29, 1938   6 Sheets-Sheet 2
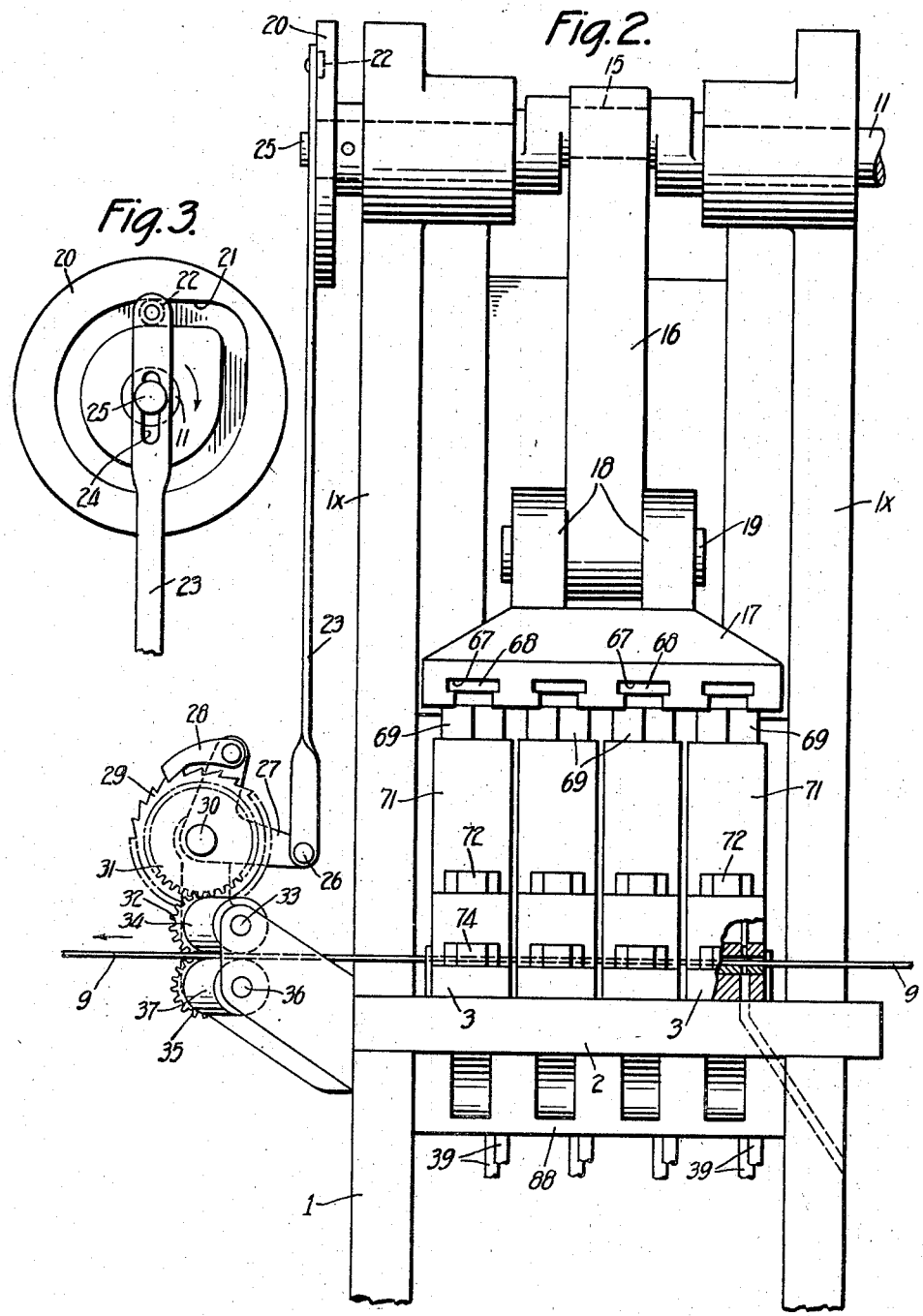
INVENTOR.
Abraham Novick
BY
ATTORNEYS

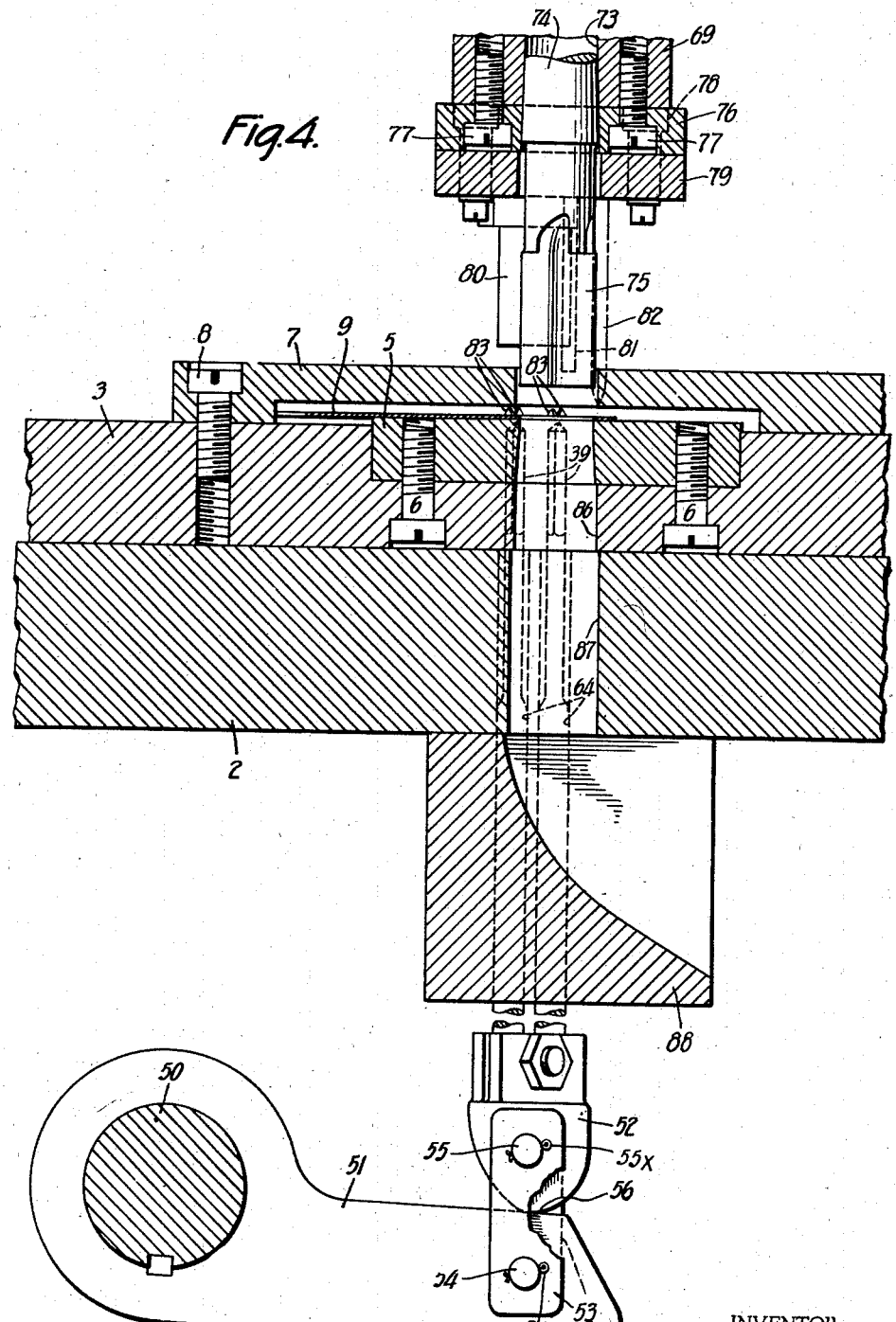

Dec. 30, 1941. A. NOVICK 2,268,080
MEANS FOR MAKING CLASP FASTENERS
Filed July 29, 1938 6 Sheets-Sheet 4
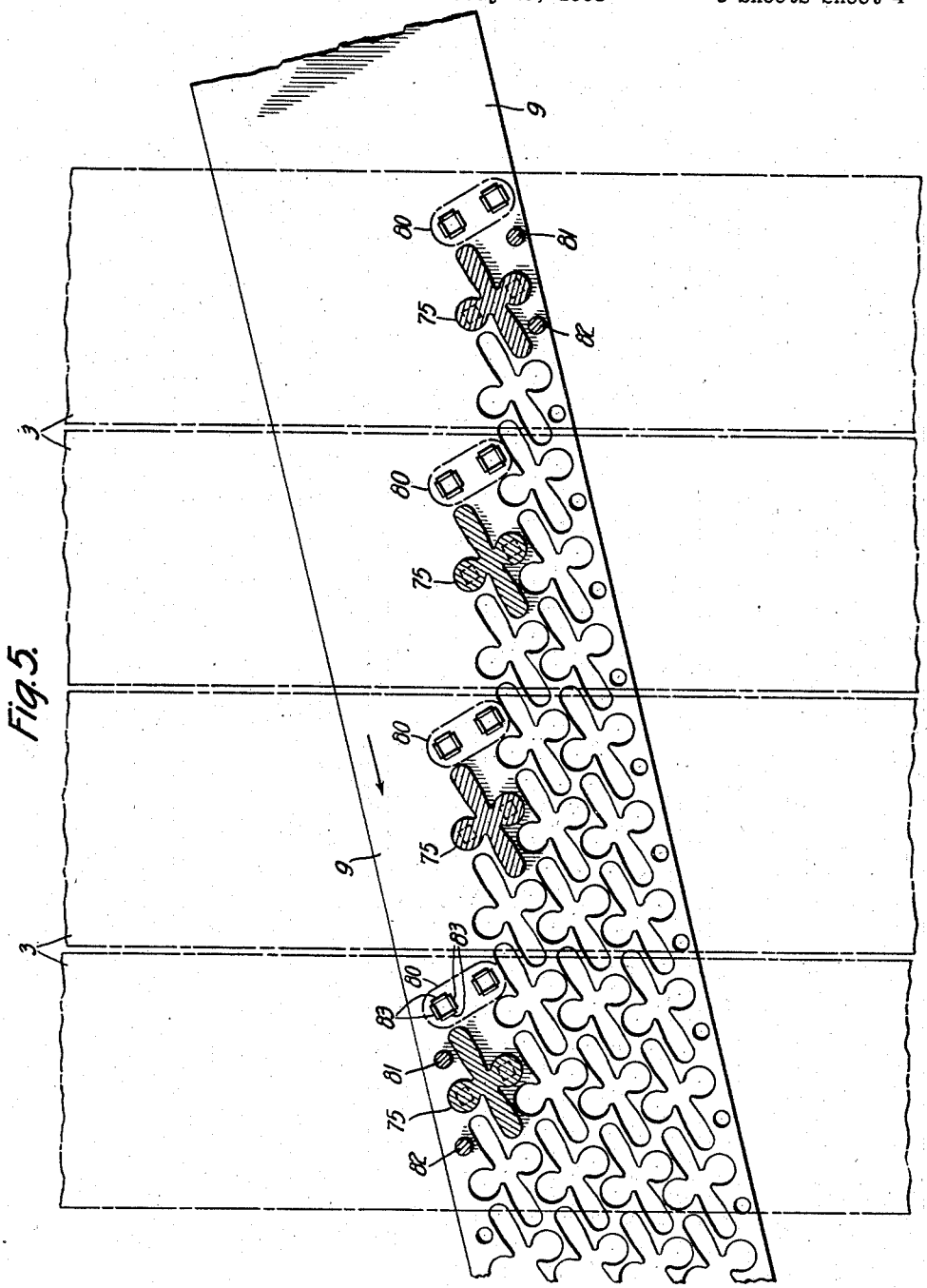
INVENTOR.
Abraham Novick
BY
ATTORNEYS Dec. 30, 1941.  A. NOVICK  2,268,080
MEANS FOR MAKING CLASP FASTENERS
Filed July 29, 1938   6 Sheets-Sheet 5

INVENTOR.
Abraham Novick
BY Moses & Nolte
ATTORNEYS

Dec. 30, 1941.  A. NOVICK  2,268,080
MEANS FOR MAKING CLASP FASTENERS
Filed July 29, 1938    6 Sheets-Sheet 6
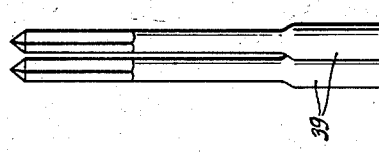
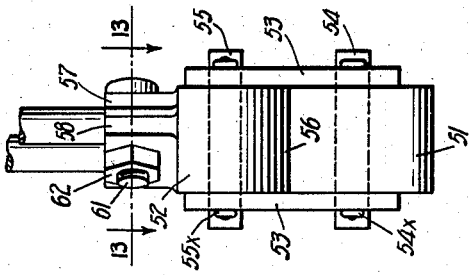
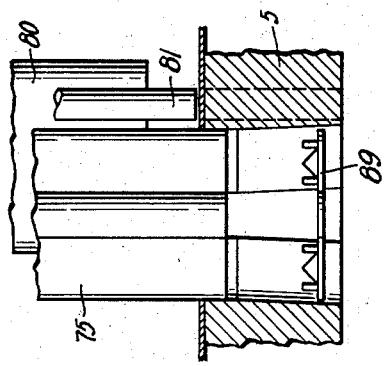
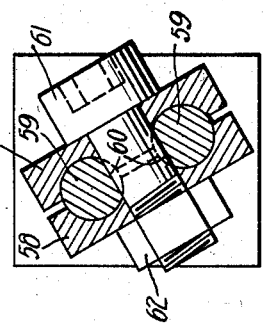
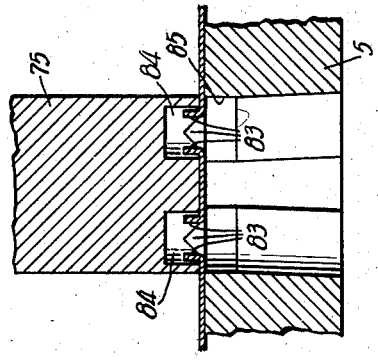
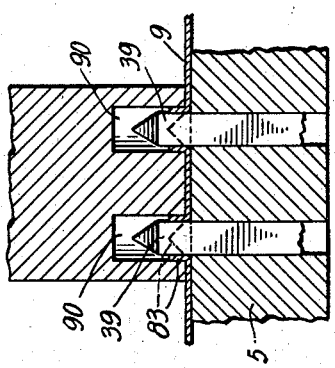
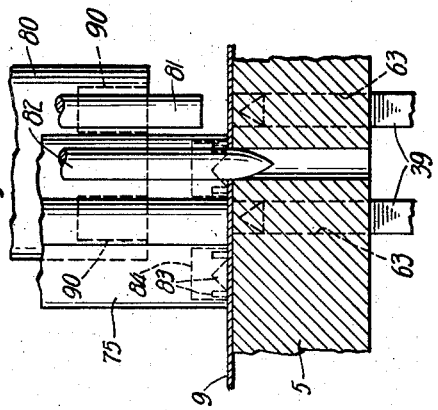
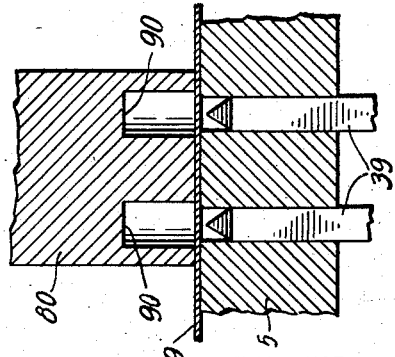
INVENTOR.
*Abraham Novick*
BY *Moses & Nolte*
ATTORNEYS Patented Dec. 30, 1941

2,268,080

UNITED STATES PATENT OFFICE 2,268,080

MEANS FOR MAKING CLASP FASTENERS

Abraham Novick, Flushing, N. Y., assignor to F. L. Smithe Machine Co., Inc., New York, N. Y., a corporation of New York Application July 29, 1938, Serial No. 221,981

12 Claims. (Cl. 29—13)

This invention relates to means for making clasp fasteners for envelopes.

A fastener of the kind referred to is stamped from malleable sheet metal, and comprises oppositely extending legs having perforations in them which are bordered by upstanding attaching prongs. The fastener also includes oppositely extending arms disposed at right angles to the direction of the legs, which initially lie in the plane of the central body portion or substantially so, but which are adapted when the fastener has been attached to the back of an envelope by the prongs to be turned upward into substantially parallel relation, to be passed through an opening in the closure flap of the envelope, and then to be folded down again substantially to their original positions.

A salient object of the present invention is to provide the efficient, economical and accurate manufacture of the fasteners without unnecessary handling.

To these ends it is a point that a strip or web of sheet material suitable for use in making the fasteners is drawn successively past a prong forming station, and a fastener punching station, across a suitable table or other support, and that the prongs are punched upward at the prong forming station so as not to interfere with the advance of the strip or web in passing from the prong forming station to the fastener punching station.

In accordance with this procedure, the web, after the prongs have been punched, presents no downward projections which would interfere with the smooth feeding forward of the web in contact with the supporting table or dies. At the fastener punching station a fastener including the formed prongs is struck from the web so that the prongs are thenceforward eliminated from the web.

The waste portion of the web from which the fasteners have been struck is utilized for drawing the web forward step by step, and since the waste web is simply a plain sheet of metal having holes punched in it, it is well adapted to be drawn forward by a feed roll couple.

The punching of the prongs in advance of the stamping out of a fastener containing those prongs is an important feature since it obviates the necessity of collecting the stamped fasteners in stack form, and feeding them individually through a second machine for forming the prongs.

A further feature of the invention has to do with accurately controlling the feeding and the positioning of the metal web for punching. On each side of the web path there are provided a pilot hole punch and a jig pin. These are located just one feeding step apart. At each punching operation the jig pins enter the jig holes punched at the last preceding operation so that the metallic web is definitely located to accurately position the prongs with reference to the punches, before any of the punches have engaged the work. Then as an incident of the prong punching and blank punching operations, the jig punches also operate to punch fresh jig holes for accurately controlling the position of the web at the next punching operation.

The invention contemplates the tumbling of the fasteners after they have been formed to smooth the edges and eliminate burrs as disclosed and claimed in my pending application Serial No. 207,435, filed May 12, 1938 for Clasp fasteners and method of making same, now Patent No. 2,264,184. The fasteners come out of the present punching process in a scrambled or heterogeneous arrangement. Counting of the fasteners, themselves, before they are shipped in order to put a proper quantity in a shipping package would necessarily involve the unscrambling of the fasteners in order that they might be passed through a counting device. The unscrambling of the fasteners would serve no other useful end because the fasteners are heterogeneously packed for shipment and are adapted to be automatically unscrambled in the hopper of a machine which feeds the fasteners one by one to a setting station and applies them to envelopes.

The necessity for a separate counting operation is obviated, however, by collecting the product of each punch in a separate collection and counting the punching operations, so that each collection at all times contains the number of fasteners indicated by the counter. When each collection contains a predetermined number of fasteners, that collection is removed as a separate batch, subjected to the tumbling treatment, and then packed into one package as a shipping unit. Thus the fasteners are counted as they are made, and the benefit of the count is preserved through the tumbling operation.

The invention has to do with the provision of a novel machine which is adapted to operate upon the fastener blank material substantially in the manner already referred to.

This machine comprises a series of prong forming punches disposed beneath the path of web travel and operable upward to punch the prongs upward from the web. It also comprises a series of opposed hollow die members located above the path of web travel, and each adapted to be entered by a pair of the prong forming punches. The machine further includes a series of fastener punching dies which operate downward from above the path of blank feeding and exactly one feeding step after the prong forming dies, to punch the fasteners from the web. The fastener punches and the dies which cooperate with the prong punches of a single set are carried by a common vertically reciprocable carrier. This carrier and the prong forming punches are operated from a common operating shaft in properly timed relation with one another, and in time with step by step web feeding mechanism.

There may be as many of these punch and die sets incorporated in a single machine as desired. In the illustrative instance, four such sets are present, and provision is made for separately collecting the fasteners formed by each set.

Other objects and advantages will hereinafter appear.

In the drawings forming part of this specification, and illustrating a practical and advantageous machine embodying the invention, and adapted for carrying out the method of the invention, Fig. 1 is a fragmentary view in end elevation of the punching machine partly in section and some of the parts being omitted;

Fig. 2 is a fragmentary view in front elevation of the machine of Fig. 1;

Fig. 3 is a fragmentary, detail view illustrating a portion of the feeding mechanism for the metallic web from which the blanks are formed;

Fig. 4 is a fragmentary end view in sectional elevation partly broken away, illustrating particularly the parts of a single die set and operating means for the prong forming punches of that set;

Fig. 5 is a fragmentary, plan view illustrating a portion of a metallic web en route through the machine, and showing the overhead punches in section;

Fig. 7 is a fragmentary view in sectional elevation taken upon the line 7—7 of Fig. 6, looking in the direction of the arrows;

Fig. 8 is a view similar to Fig. 7 taken upon the line 8—8 of Fig. 6, looking in the direction of the arrows;

Fig. 9 is a view similar to Fig. 7 showing the parts in the positions occupied by them just after a fastener has been punched from the web;

Fig. 10 is a view similar to Fig. 7, taken upon the line 10—10 of Fig. 6, and showing the parts in the positions occupied by them just as the prong forming punches are about to enter the material;

Fig. 11 is a view similar to Fig. 10 showing the prong forming operation;

Fig. 12 is a view in elevation showing a set of prong forming punches and the carrier therefor, the prong forming punches being broken away intermediate their ends for compactness of illustration; and Fig. 13 is a sectional view taken upon the line 13—13 of Fig. 12 looking in the direction of the arrows.

Figure 1:
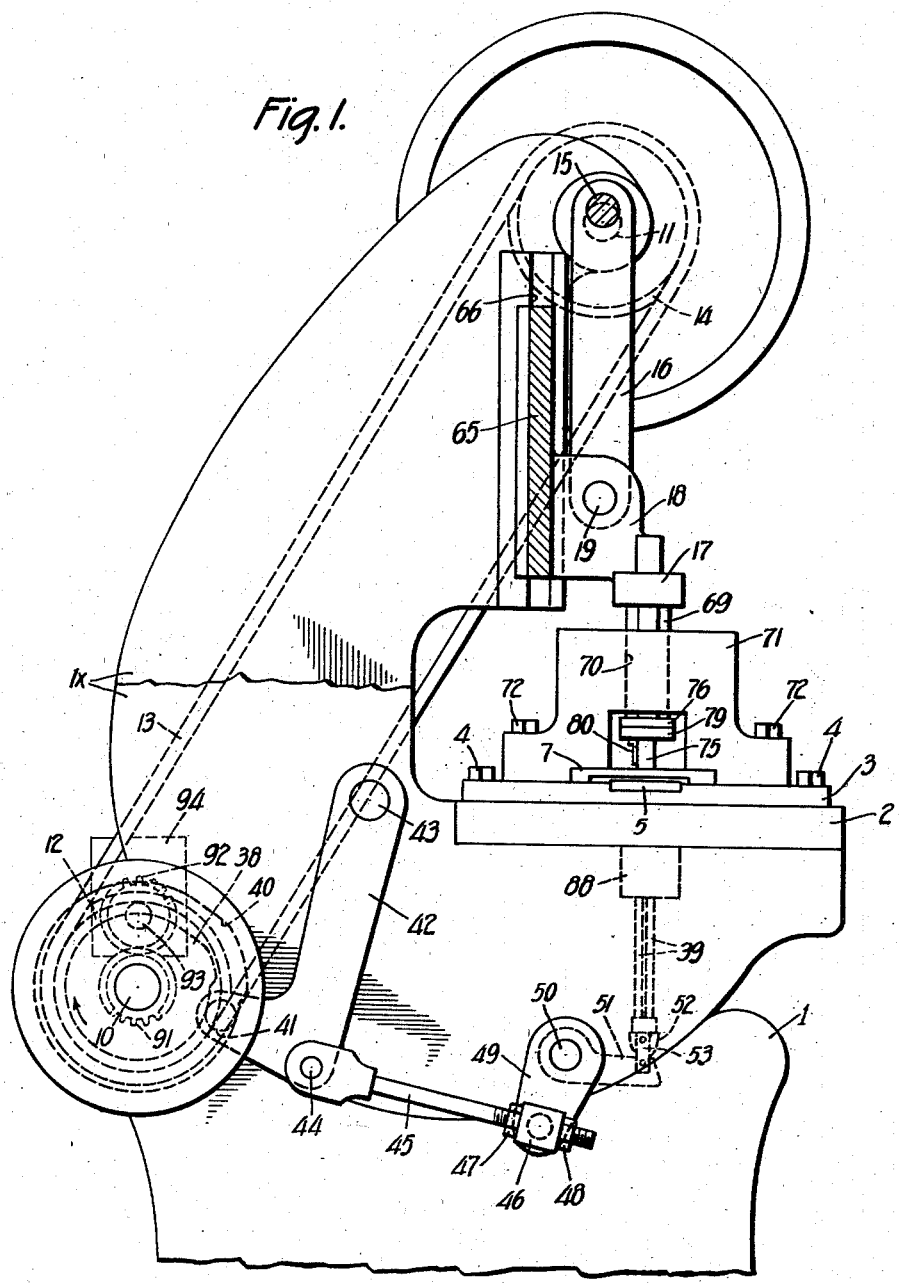

The machine illustrated in Figs. 1 to 13 inclusive, comprises a frame 1, including a supporting bed or block 2 to which a series of die carrying blocks 3 is secured by means of machine screws 4. Each of the blocks 3 has a die block 5 secured to it by means of machine screws 6. A stripper plate 7 is secured to each block 3 by means of machine screws 8. The stripper plates 7 have recessed lower faces, the recesses being of sufficient depth to accommodate and clear the prongs which are struck upward from the web 9 of metallic material from which the fasteners are formed.

The operating parts of the machine are all driven from a common shaft 10 which drives an upper shaft 11 through a sprocket 12 fast on the shaft 10, a driving chain 13, and a sprocket 14 fast on the shaft 11. The shaft 11 is journalled in upwardly reaching arms 1x of the frame 1 and is formed with an offset or eccentric crank portion 15 which through a link 16 drives an upper die carrier 17. The link 16 is pivotally connected to the die carrier 17 by means of upstanding ears 18 formed on the die carrier 17, and a pin 19 which is passed through the ears and the lower end of the link 16.

The shaft 11 has fast upon one end thereof a track cam 20, Figs. 2 and 3, whose track 21 receives a follower roller 22 carried by the upper end of a connecting rod 23. The connecting rod 23 passes across the end of the shaft 11 and is provided with a slot 24 for receiving the shank of a headed screw 25. The screw 25 is threaded axially into the end of the shaft 11 and its shank serves to guide the connection rod 13 for vertical reciprocatory motion under the influence of the cam. The lower end of the connecting rod 23 is pivotally connected through a pin 26 with one arm of a bell crank lever 27. The other arm of the bell crank lever 27 has pivoted upon it a pawl 28, which may be spring pressed, for acting upon a ratchet wheel 29 fast on the shaft 30. Reciprocation of the connecting rod 23 produces oscillation of the bell crank 27, and hence causes step by step feeding of the ratchet wheel 29 through the pawl 28.

The shaft 30 has fast upon it a gear 31 which drives a gear 32 fast on a shaft 33. The shaft 33 has fixed upon it a feed roll 34. The gear 32 drives a gear 35 fast upon a shaft 36. The shaft 36 has fast upon it a feed roll 37. One of the feed rolls 34 and 37 may be spring pressed toward the other and they cooperate with one another to grip the metallic web 9 between them and to draw it forward step by step at each advancing movement of the ratchet wheel 29.

The shaft 10 has fast upon it a cam 38 for operating prong forming punches 39. The cam 38 is formed with a track 40 which acts upon a follower roller 41. The roller 41 is carried by an arm of a bent lever 42 which lever is fulcrumed upon a bearing pin 43 carried by the machine frame 1. The lever 42 is pivotally connected through a pin 44 with a lengthwise adjustable link 45. The link 45 is threaded at its end remote from the pin 44 and is passed through a pivot block 46, and secured thereto by nuts 47 and 48 which are adapted to be adjusted longitudinally of the link 45 and to be brought into clamping relation to the block 46. The pivot block 46 is pivotally mounted upon a crank 49, and the crank in turn is fast upon a shaft 50. The shaft 50 is supported in frame bearings, and has fast upon it a series of cranks 51, Figs. 1, 4 and 12, each adapted to operate a prong punch carrier 52. Two parallel links 53 are pivotally connected at their lower ends to the crank 51 by means of a pin 54 and are pivotally connected at their upper ends to the prong punch carrier 52 by means of a pin 55, the pins 54 and 55 being held in place axially by cotter pins 54x and 55x. The prong punch carrier 52 is formed with a rounded cam surface 56 on its lower side remote from the shaft 50, which surface is adapted to be engaged by the crank 51 for thrusting the prong punch carrier upward. The prong punch carrier is adapted to be drawn downward by the crank 51 through a downward pull applied to the links 53.

As best seen in Fig. 13, the prong punch carrier is split at its upper end to divide it into opposed jaws 57 and 58. The jaws are formed with complementary substantially semi-cylindrical recesses for accommodating the cylindrical ends 59 of the prong punches 39. Each of the cylindrical ends 59 is formed with a transverse, arcuate recess 60 for interfitting with the shank of a transverse bolt 61 which is passed centrally through the jaws 57 and 58, and upon which a clamping nut 62 is threaded. The arrangement described serves to lock the prong punches positively against rotative and longitudinal movements with respect to the prong punch carrier 52.

The prong punches extend upward and are guided for right line movement by bores 63 formed in the associated die block 5, and by bores 64 formed in the block 2.

The described operating mechanism for the prong punches is effective to operate the punches 39 upward intermittently at times when the strip or web 9 is held stationary. This will be described more fully after the description of the overhead punch mechanism has been given.

Figure 6:
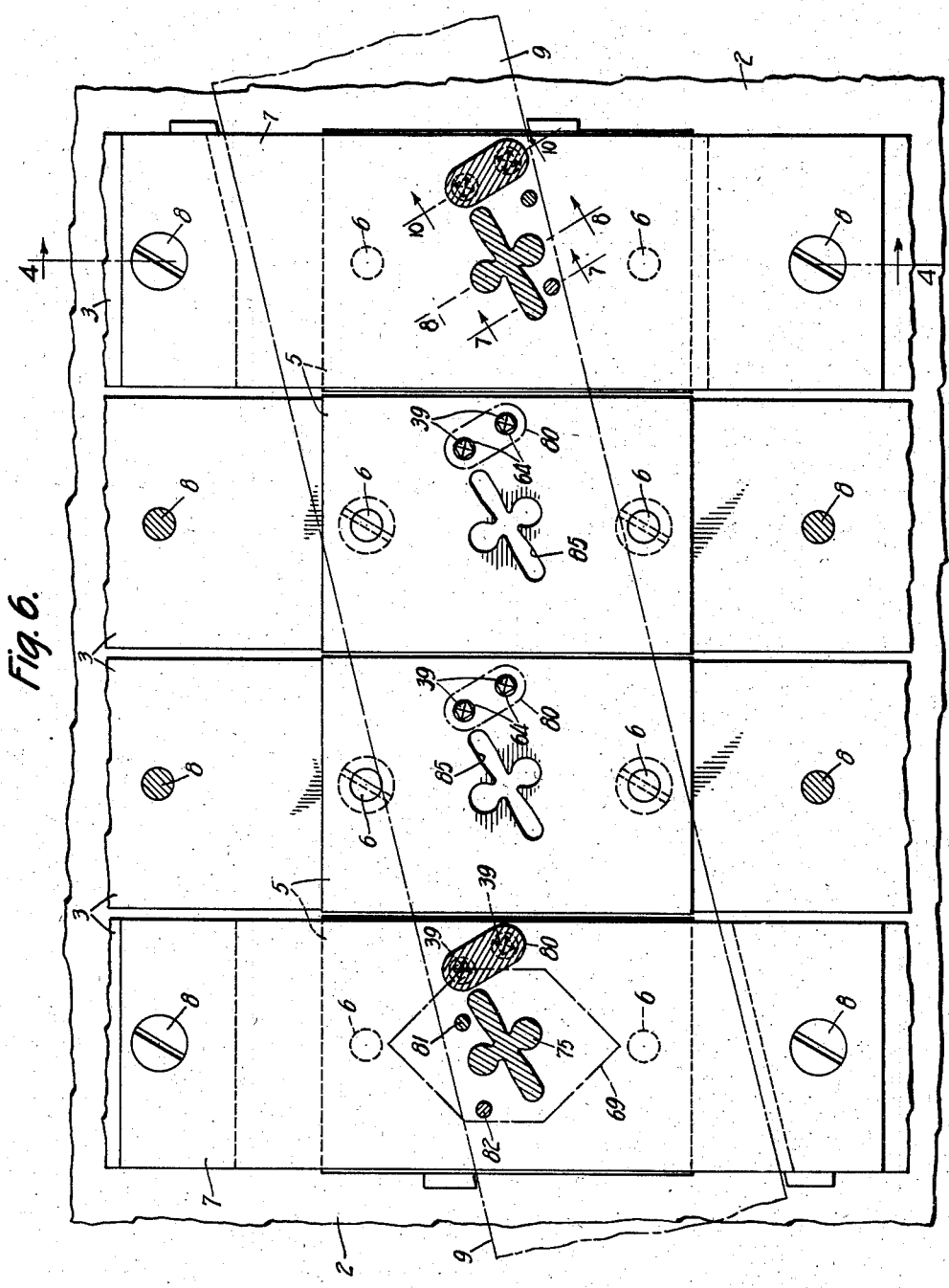
Fig. 6 is a fragmentary, sectional, plan view of the machine with the two intermediate sets of overhead punches and their cooperative stripper plates removed.

It will be remembered that the overhead shaft 11 has been described as operating an overhead punch carrier 17 through a crank 15 and a link 16. The carrier 17 is formed with a guide web 65, Fig. 1, whose margins travel in guide channels 66 formed in the upper part of the machine frame. The carrier 17 as illustrated is adapted to carry four overhead die units. The lower face of the carrier 17 is formed with four T-grooves 67, Fig. 2, each adapted to receive a T-head portion 68 of a unit carrier 69. Each unit carrier 69 is of hexagonal form in cross section as illustrated in Fig. 6. It is guided in a correspondingly formed bore 70 of a yoke-like guide block 71. The guide block 71 is secured upon one of the bed plates 3 by means of bolts 72. The guide block 71 is the only means for retaining the unit carrier 69 in association with the main carrier 17. When, therefore, it is desired to remove an upper guide unit from the machine, this may very readily be done simply by taking out the screws of that unit. This permits the immediate removal and replacement of the unit.

The lower end of each carrier 69 is formed with a tapered bore 73, Fig. 4, into which the tapered shank 74 of one of the fastener punching dies 75 is driven to secure it permanently in place. To the lower face of each carrier 69 a square block 76 is secured by means of countersunk machine screws 77. Headed screws 78 have their heads set in sockets formed in the upper side of block 76 and extend downward to be threaded through a block 79. The screws 78 are freely rotatable with reference to the block 76 but have screw driver slots formed in their lower, smaller ends so that they may be turned to thread them into the block 79. One of the dies 80 for cooperating with the prong forming punches is fixedly secured to each of the blocks 79. It will be observed that all of the punches 75 and 80 move up and down in unison with the main die carrier 17 and in unison with one another.

Each block 79 of the two outermost punch sets has affixed to it a pilot punch 81 and a jig pin 82. Each jig pin 82 has a tapered, rounded point and is substantially longer than the associated pilot punch 81, as illustrated for example, in Fig. 7. The associated jig pin and punch are located in the relation to one another illustrated in Figs. 5 and 6. The web 9 is shown in Fig. 5 as having the jig pin 82 entered in one pair of pilot openings, and the pilot punches 81 in positions to punch a succeeding pair of pilot openings. When the illustrated punching operation is complete the web is fed forward one feeding step which carries the pilot openings formed at the current operation into substantial alignment with the jig pins 82, so that the jig pins, in cooperation with the pilot openings, serve accurately to position the web before the next pair of pilot openings is punched. This cooperative relation is maintained, step by step, throughout the feeding of the entire web.

As seen in Fig. 7, the web 9 has been positioned by the pilot 82 and the die 75 has descended into engagement with the upper face of the web 9 and is about to be driven through the web for punching a fastener from the web. Since the fastener area contains upstanding prongs 83 which were formed at the preceding operation of the prong forming punches, the die 75 is provided with recesses 84 in its lower face for accommodating the prongs without binding. The punch 80 is of appropriate contour to punch out the arm and leg fastener in cooperation with the die 5. The die 5 has an opening 85 formed in it of appropriate cruciform shape for cooperating with the die 80. The lower portion of the opening 85 is enlarged to permit the stamped blank to drop readily through the die 5. The die carrying plate 3 and the bed plate 2 are provided, respectively, with passages 86 and 87 for delivering the punched blanks into a chute element 88 which is attached to the bottom of the bed plate 2. Fig. 9 shows the die 75 entering the opening 85 and the punched fastener 89 falling away. All this occurs while the jig pin 82 has been passing downward through the web 9 although, as seen in Fig. 9, the pilot punch 81 has not yet entered the web. The further descent of the overhead die mechanism, however, carries the pilot punch 81 through the web and carries the die 80 down against the web as seen in Fig. 10. Just as the die 80 comes in contact with the web, the cam 38 acts suddenly to thrust the prong punches 39 upward through the web as seen in Fig. 11. The punches 39 enter recesses 90 formed in the lower end of the die 80. The walls of these recesses cooperate with the punches to shape the prongs as illustrated in Fig. 11.

The cam 38 holds the prong punches 39 in their elevated positions for only a brief period and then causes them to be withdrawn. At the same time, the crank 15 will have crossed bottom dead center and started upward so that the overhead die mechanism is carried upward. During this upward movement the stripper plate 7 is effective to limit upward movement of the web 9 and cause it to be stripped from the die 75, the die 81, and the jig pin 82. The jig pin 82 is the last member to clear the web.

When the jig pin has moved clear of the web, the cam 20 acts quickly (see Fig. 3) to operate the web feeding means a step, so that the feeding step is completed before the jig pin has again moved down far enough to engage the web.

The sequence of operations as already described is now repeated, the upwardly extending prongs formed at the described operation being shifted into position to have a fastener punched from the web area which includes them, by the punch 75.

After the fasteners have been formed in the manner described, they are put into a tumbling drum and tumbled to smooth the edges and eliminate burrs as described and claimed in my pending application Serial No. 207,435.

The fasteners are accumulated in a scrambled condition as they leave the punching machine, and they are in a scrambled condition when they leave the tumbling drum. There is no need to unscramble them, for they can be packed for shipment in a scrambled condition and will be unscrambled in the hopper of a fastener setting machine which feeds the fasteners one by one to a setting station and applies them to envelopes.

The necessity for unscrambling the fasteners in order to count them is obviated in accordance with the present invention by providing a counter to count the punching operations. The shaft 10 is provided with a gear 91 which drives a gear 92 fast on a countershaft 93. A counter of conventional form is employed, the counter casing being indicated at 94. The fasteners punched by each punching unit are separately collected so that each collection contains at all times the number of fasteners indicated by the counter. When a predetermined, desired number is indicated by the counter the fasteners are removed from the machine, each collection being kept separate from the others.

Each collection is then put through the tumbling process as a separate batch, and when the tumbling is complete that batch is made up into a shipping package for shipment. In this way the need for unscrambling the fasteners to count them is obviated, the benefit of the original count derived at the punching operation being preserved throughout.

I have described what I believe to be the best embodiments of my invention. I do not wish, however, to be confined to the embodiments shown, but what I desire to cover by Letters Patent is set forth in the appended claims.

I claim:

1. A machine for making flat fasteners with projecting prongs comprising, in combination, means for feeding a strip of fastener metal step by step, means for forming prongs on the strip at one station including a reciprocating prong punch and an opposed retreating die, stripper means disposed at both sides and both ends of the die at a short uniform distance from the path of strip feed and engageable with the strip to limit movement of the strip with the die as the die retreats, and means for punching a fastener from the pronged area of the strip at a subsequent station.

2. A machine for making flat fasteners with projecting prongs comprising, in combination, means for feeding a strip of fastener metal step by step, means for forming prongs on the strip at one station including a reciprocating prong punch and an opposed retreating die, stripper means disposed at both sides and both ends of the die at a short uniform distance from the path of strip feed and engageable with the strip to limit movement of the strip with the die as the die retreats, means for punching a fastener from the pronged area of the strip at a subsequent station, and means timed to operate the forming and punching means in the interval between feeding steps.

3. A machine as set forth in claim 1 in which the prong forming means acts to form prongs upward from the strip, the stripper means is disposed above the strip path and the fastener punching means acts to punch the fastener downward from the strip.

4. A machine for making flat fasteners with projecting prongs comprising, in combination, means for feeding a strip of fastener metal step by step along a predetermined path, means for forming upwardly projecting prongs on the strip at a first station, comprising punches which operate upward through the strip from beneath said path, and an opposed cooperating hollow die operating downward toward the strip from above said path, positively acting stripper means disposed at both sides and both ends of the die at a short uniform distance above said path for disengaging the strip from the hollow die as the latter retreats in an upward direction, and means for punching a fastener from the pronged area at a subsequent station comprising a fastener punch for operating downward through the strip from above said path.

5. A machine as set forth in claim 4 which further includes a common carrier for the hollow die and the fastener punch to operate said die and punch in unison.

6. A machine as set forth in claim 4 which further includes a common carrier for the hollow die and the fastener punch to operate said die and punch in unison, and means for operating the prong forming punches in timed relation to the hollow die and the fastener punch.

7. A machine as set forth in claim 1 which further includes a pilot punch for punching a pilot hole in the strip at the first station, and a jig pin for cooperating with the pilot hole at the second station in locating the strip properly, and means for operating the pilot punch and the jig pin in unison with one another and with the fastener punching means, said jig pin having a tapered, rounded tip which extends beyond the end of the pilot punch to enter the strip in advance of engagement of the pilot punch with the strip.

8. A machine for making flat fasteners with projecting prongs comprising, in combination, means for feeding a strip of fastener metal step by step, means for simultaneously forming prongs on the strip at one station suitable for embodiment in a plurality of fasteners, comprising a plurality of sets of prong punches, and means for punching a plurality of fasteners from the pronged areas of the strip at a subsequent station, comprising a plurality of fastener punches, a punch carrier for each fastener punch, a separate removable guide block for each punch carrier, and a common reciprocable carrier for all the fastener punch carriers, each punch carrier being removably interfitted with the common carrier.

9. A machine for making flat fasteners with projecting prongs comprising, in combination, means for feeding a strip of fastener metal step by step, means for simultaneously forming prongs on the strip at one station suitable for embodiment in a plurality of fasteners, comprising a plurality of sets of prong punches, and means for punching a plurality of fasteners from the pronged areas of the strip at a subsequent station, comprising a plurality of fastener punches, a punch carrier for each fastener punch, and a common carrier for all the fastener punch carriers, said fastener punches being arranged in a row extending transversely of the direction of strip travel, and pilot means mounted on the carriers of the outer punches of the row to act upon opposite marginal areas of the strip, said pilot means including in each instance a pilot punch for punching a pilot opening at the first station, and a jig pin cooperating with the pilot opening at the second station.

10. A machine for making flat fasteners with projecting prongs comprising, in combination, means for feeding a strip of fastener metal step by step, means for simultaneously forming prongs on the strip at one station suitable for embodiment in a plurality of fasteners, comprising a plurality of sets of prong punches, and means for punching a plurality of fasteners from the pronged areas of the strip at a subsequent station, comprising a plurality of fastener punches, a punch carrier for each fastener punch, a separate removable guide block for each punch carrier, and a common reciprocable carrier for all the fastener punch carriers, each punch carrier being removably interfitted with the common carrier and means for separately conducting the fasteners formed by the several fastener punches to separate points of collection.

11. In a machine for making fasteners, the combination with means for feeding a strip of fastener metal step by step, of a prong forming punch acting periodically to punch prongs from the strip, means for supporting and operating the punch comprising a punch carrier, said punch including a cylindrical shank having a transversely extending notch in one of its sides, and said carrier being split to provide clamping jaws and having a shank receiving socket formed between the jaws, and a clamping and holding member passed transversely through the carrier to pass through both clamping jaws and through the notch of the shank to hold the punch against rotary and longitudinal movements.

12. In a machine for making fasteners, the combination with means for feeding a strip of fastener metal step by step, of a prong forming punch acting periodically to punch prongs from the strip, means for supporting and operating the punch comprising a punch carrier, said punch including a cylindrical shank having a transversely extending arcuate notch in one of its sides, and said carrier being split to provide clamping jaws and having a shank receiving socket formed between the jaws and a clamping bolt having a cylindrical shank passed transversely through the carrier to pass through both clamping jaws and through the notch of the shank to hold the punch against rotary and longitudinal movements.

ABRAHAM NOVICK.